United States Patent [19]

Nevery

[11] Patent Number: 5,036,595
[45] Date of Patent: Aug. 6, 1991

[54] GAUGE HOLDER

[76] Inventor: Arpad Nevery, 1572 Edgefield Rd., Lyndhurst, Ohio 44124

[21] Appl. No.: 463,524

[22] Filed: Jan. 11, 1990

[51] Int. Cl.⁵ .................................... B23Q 17/00
[52] U.S. Cl. ...................... 33/642; 33/572; 248/904
[58] Field of Search ............. 33/642, 632, 638, 644, 33/572; 248/124, 904, 279

[56] References Cited

U.S. PATENT DOCUMENTS

| | | | |
|---|---|---|---|
| 1,059,948 | 4/1913 | Neberle | 248/904 |
| 2,601,965 | 7/1952 | Scalise | 248/124 |
| 2,635,345 | 4/1953 | Samborski | 248/124 |
| 2,721,390 | 10/1955 | Pasturczak | 33/642 |
| 3,029,520 | 4/1972 | Reeves | 33/642 |
| 3,531,867 | 10/1970 | Viollett | 33/642 |
| 4,208,157 | 6/1980 | Guarino et al. | 248/904 |
| 4,750,699 | 6/1988 | Tingley | 248/904 |
| 4,781,351 | 11/1988 | Parapetti | 248/904 |

Primary Examiner—Thomas B. Will
Attorney, Agent, or Firm—Calfee, Halter & Griswold

[57] ABSTRACT

A gauge holder for mounting a gauge on a machine chuck jaws and a bed is provided. The gauge holder includes a fixture which is adapted to be secured in the chuck jaws, and a pair of rods. Either one of the rods is slidably engagable in the fixture, parallel to the bed. The rods are swivelly interconnectable to each other at their ends, and a gauge can be connected to one end of each rod. This configuration allows centering of a work piece on the bed using hard to reach surface as a reference.

14 Claims, 5 Drawing Sheets

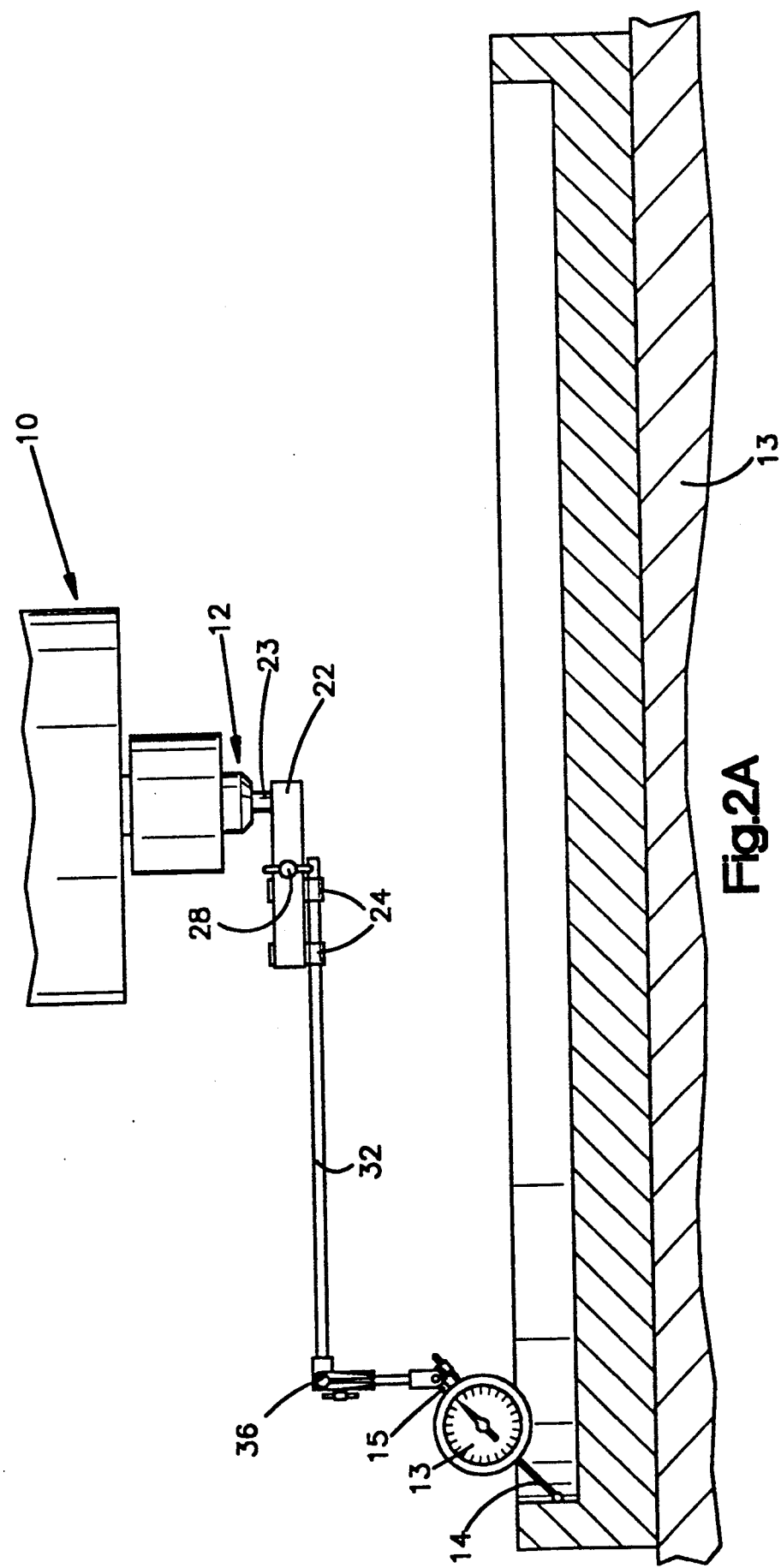

GAUGE HOLDER

BACKGROUND OF THE INVENTION

When performing various machining operations, especially machine operations on a drill press, is it frequently necessary to determine the precise center of a workpiece which is being worked upon. There have been several prior proposals for techniques for determining the center. One of these techniques employs the use of a gauge which conventionally is connected to a jointed arm which arm in turn can be chucked into the chuck jaws of a drill press or similar machine. The gauge is secured by some type of clamping means on the end of the jointed arm and the jointed arm is then extended in some manner to bring the gauge into contact with the workpiece.

The workpiece to be centered will be provided with some type of cylindrical surface which is either an interior or an exterior surface, and the gauge is engaged against this surface while the chuck is rotated with the gauge being continuously held in contact with the cylindrical surface. The fluctuation of the gauge during this rotation of the chuck jaw will indicate how much offcenter the piece is and in which direction. A skilled machinist looking at the gauge, will then be able to reposition the workpiece and again take the readings from the gauge, with this repositioning taking place several successive times if necessary, until the gauge shows no deviation of the cylindrical surface from the center. When the gauge ceases fluctuation during rotation, this will then indicate that the workpiece is centered precisely in the center of the cylindrical surface which has been used as the reference.

While this technique is an effective way for determining the center, nevertheless the conventional prior fixtures or arms for mounting the gauge have demonstrated certain limitations. Specifically, the mounting arms have to provide the needed extension and flexibility for the gauges to be able to contact surfaces which may be a great distance away from the chuck jaws, either laterally or vertically, so these are for centering on pieces where the cylindrical surface is relatively near the chuck. Also the prior gauge holders have not proved to be effective in many cases to access difficultly placed or hard to reach surfaces, the centers of which are to be determined.

SUMMARY OF THE INVENTION

According to the present invention, a gauge holder is provided for mounting a gauge on a machine having chuck jaws and a bed. The gauge holder comprises a fixture adapted to be releasably secured in the chuck jaws. First and second rod means, preferably of the same diameter and of different lengths, are provided and the fixture includes mounting means adapted to slidably mount either of the rods in a plane generally parallel to the bed of the machine. Means are provided to releasably connect and swivelly mount said first and second rod means to one another; and means are provided to releasably connect and swivelly mount a gauge to either of said rod means.

DESCRIPTION OF THE DRAWING

FIG. 2A is a view similar to FIG. 2, showing the gauge holder of the present invention assembled in a somewhat different manner to locate the center of a very wide workpiece;

DESCRIPTION OF THE PREFERRED EMBODIMENTS

Figure 1:
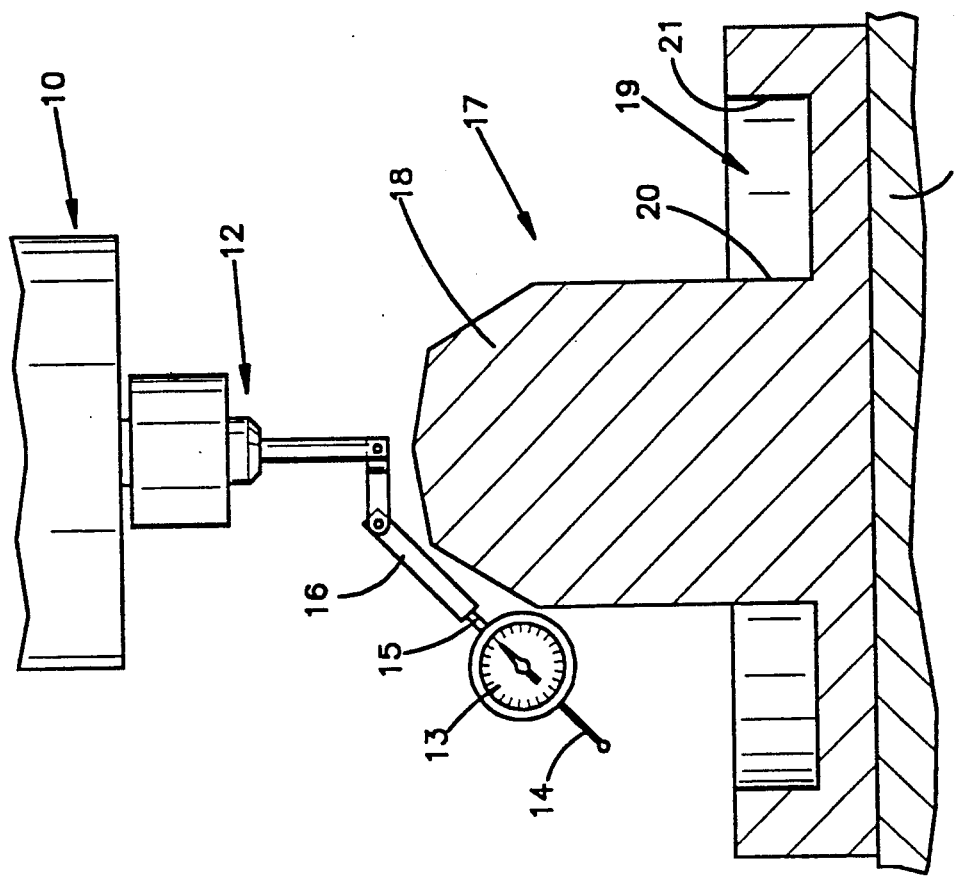
FIG. 1 is a longitudinal sectional view, somewhat diagrammatic, depicting a prior art gauge and mounting thereof showing its limitation for use on certain types of workpieces to locate the center.

Referring now to the drawings and for the present FIG. 1, a gauge holder according to a typical prior art configuration is shown for use in a drill press 10 which has chuck jaws 12 which can be loosened and tightened in a conventional manner to secure the holder, and a bed 13 to support workpieces. A conventional gauge 14 is secured to one end of a jointed arm 16, the opposite end of which jointed arm 16 is reasonably secured in the chuck jaws 12. FIG. 1 depicts the difficulty in using this conventional prior art gauge with a particular type of workpiece 17 which is an annular workpiece having a central hub 18 and an annular groove 19 therearound. Annular groove 19 has an innercylindrical surface 20, and an outer-cylindrical surface 21, either of which could be used to find the center of the workpiece 17. However, in order to find the center as described above, it is necessary for the gauge 14 to engage either the surface 20 or 21, and then one rotates the chuck. As can be seen from FIG. 1, the presence of the hub 17 prevents gauge 14 from engaging either of the surfaces 20 or 21 irrespective of how the jointed arm 16 may be twisted or turned. It will also be noted that the amount of extension laterally and vertically of the gauge 14 is limited in this particular configuration.

Figure 2:
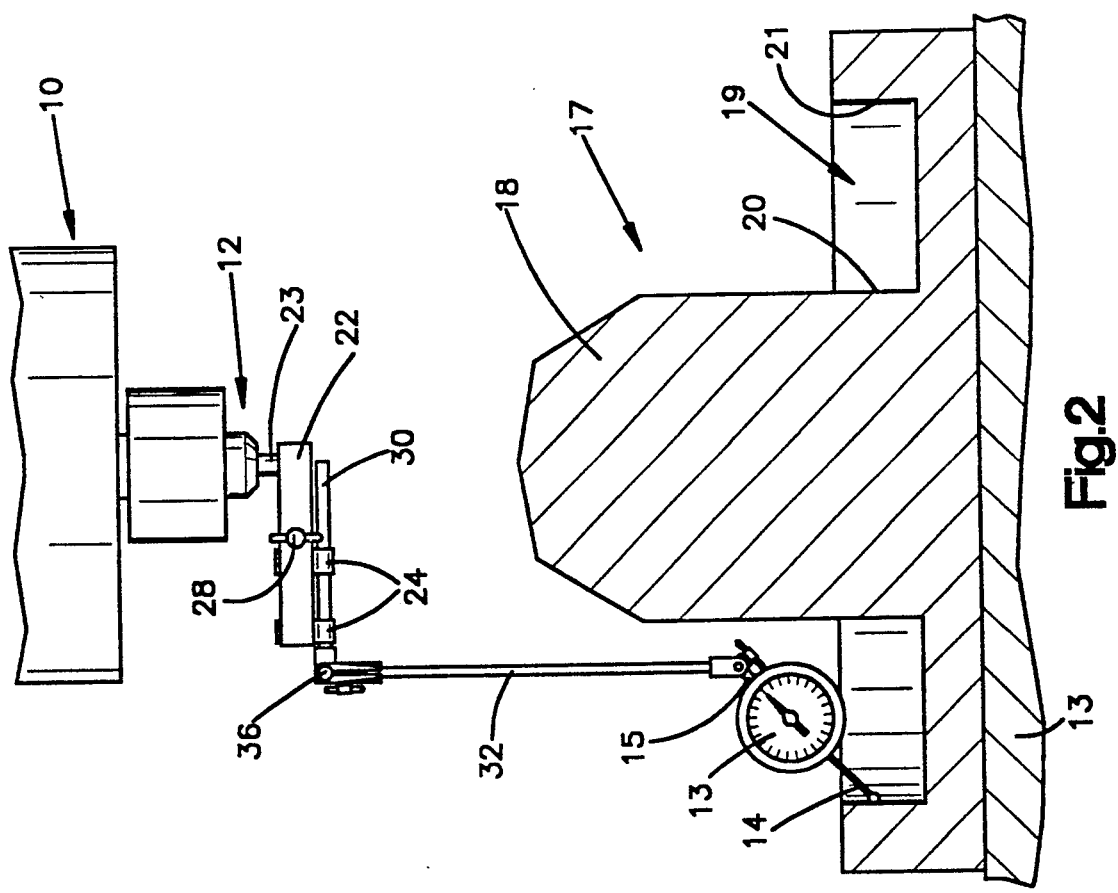
FIG. 2 shows a gauge holder according to the present invention mounted and used to determine the center of a given workpiece.
Figure 3:
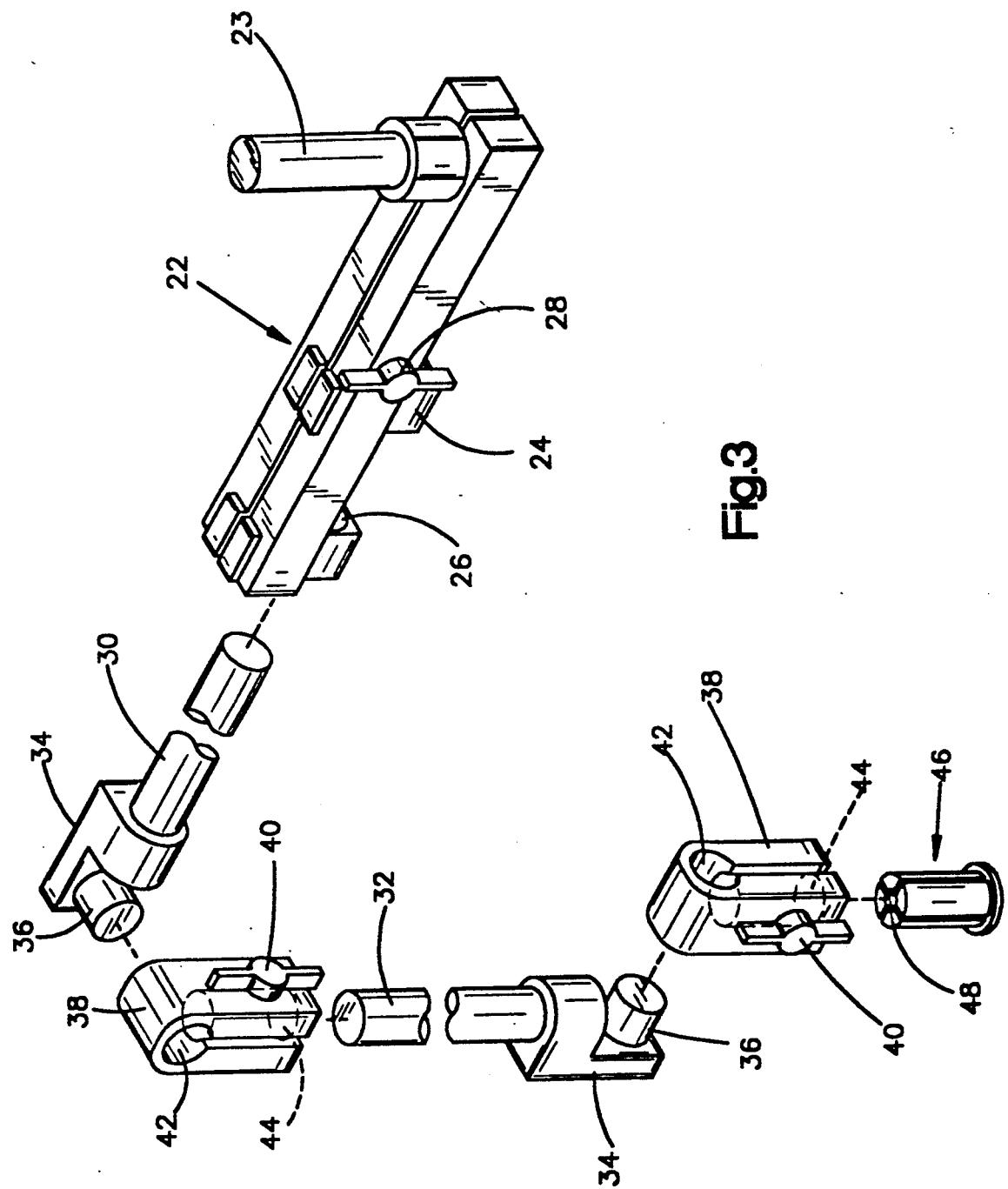
FIG. 3 is an exploded perspective view of the gauge holder of this invention.

FIG. 2 depicts one embodiment of a gauge holder according to the present invention and illustrates how it can be effectively used to find the center of the workpiece 17; FIG. 2A depicts how the gauge holder of the present invention can be assembled in a somewhat different configuration to get a very wide lateral extension; and FIG. 3 depicts in exploded form the various components of the present invention.

The tool gauge holder of the present invention includes a split fixture 22 having an engagement stud 23 extending upwardly therefrom for engagement in the chuck jaws 12 of the drill press 10. The fixture 22 also has a pair of U-shaped bands 24 disposed therebelow, which U-shaped bands 24 have apertures 26 formed therein. A thumb screw 28 passes through both sections of the split fixture 22 threadably engaging them and by rotating the thumb screw 28 in one direction or the other, the fixture 22 can be either opened or tightened down which will either enlarge or close the aperture size 26.

The gauge holder also includes a pair of cylindrical rods 30 and 32. Preferably, the rods 30 and 32 are of different lengths, the rod 30 being the shorter of the rods, and the rod 32 being the longer, although it is contemplated that the rods could be of equal length if desirable. However, by providing rods of unequal length advantages can be had for getting both lateral and vertical extension.

The rods 30 and 32 are both of such a size that they can be slidably engaged in the apertures 26 of the U-shaped bands 24 and when the thumb screw 28 is turned to loosen or open the fixture 22, the rods 30 or 32 will be firmly engaged and prevented from moving and when the fixture 22 is engaged in the chuck, the rod in the aperture 26, which in FIG. 2 is rod 30, is maintained essentially parallel to the bed 13.

Each of the rods 30 and 32 has provided at one end thereof an end cap 34 secured thereto and each end cap 34 is provided with a pivot pin 36 extending transversely to the axis of the rod 30 or 32.

The rods are interconnectable at their opposite ends as shown in FIGS. 2, 2A and 3 (particularly in FIG. 3). This connection is made by means of a split clamp 38. The clamp 38 is provided with a thumb screw 40 which will tighten and loosen the clamp as previously described with respect to the thumb screw 28 and fixture 22. The clamp 38 is also provided with a transverse opening 42 and a longitudinal opening 44. As shown in FIG. 3, the transverse opening 42 engages the pivot pin 36 on the rod 30, and the longitudinal opening 44 engages the end of the rod 32. By loosening the clamp 38 by turning the thumb screw 40, the clamp 38 can be easily slipped over the end of the rod 32 and the pivot pin 36, and then tightened down when the proper positions are attained. The gauge 13 is connectable to the end of the rod 32 which has the end cap 34 thereon by means of a second clamp 38 which is identical to the clamp which connects the two rods together. The aperture 42 is again placed over the pivot pin 36 at the end of the rod 32 and split collar gauge adapter 46 is inserted into the opening 44. The end 15 of the gauge 13 is inserted into opening 48 and the aperture of the adapter; and the thumb screw 40 when tightened, will securely hold the clamp 38 on the pivot pin 36 and will also securely hold the gauge 13 in the adapter 46. This is shown in FIG. 2. This particular configuration allows a slidable, swivelable connection of the gauge to the chuck jaws 12. This connection is a slidable and swivelable connection between the fixture 22 and the rod 30, and swivelable connections between the rods 30 and 32 and between the gauge 13 and rod 30. The slidable connection between either one of the rods 30 or 32 and the split fixture 22 allows for lateral adjustment. If a lateral extension is more than can be accommodated by the short rod 30 then the configuration show in FIG. 2A can be formed wherein in the long rod 32 is slidably engaged in the split fixture 22 and the short rod 30 is engaged at the end of the rod 32, and at the opposite end thereof, the gauge 13 is secured. This will allow centering of workpieces where the annular surface is spaced some great distance laterally from the chuck 12.

It also can be seen with a very simple fixture, two very simple rods and two universal type clamps, an extremely versatile gauge mounting tool can be provided which will be able to engage the surface of the workpiece at various different angles and different locations, even in places where it is difficult or impossible for prior art types of gauge holders to reach.

Thus as described above, the jaws 12 may be rotated or in some cases it may be possible to rotate the workpiece 17. In either case, when relative rotation between the chuck jaw and the workpiece is provided, a true center can be obtained in a conventional manner.

Figure 4:
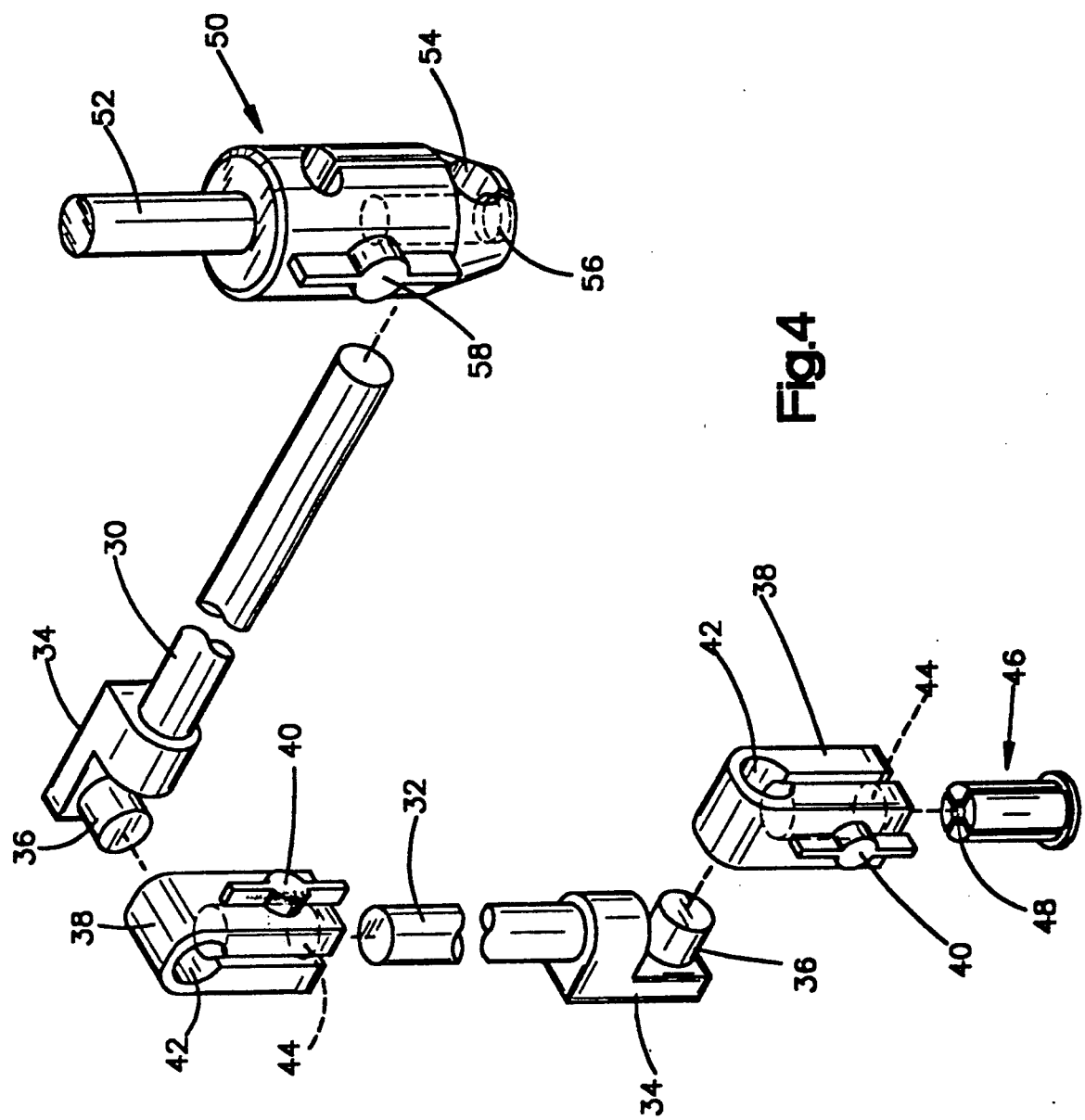
FIG. 4 is an exploded perspective view of a different embodiment of the gauge holder of the present invention.
Figure 5:
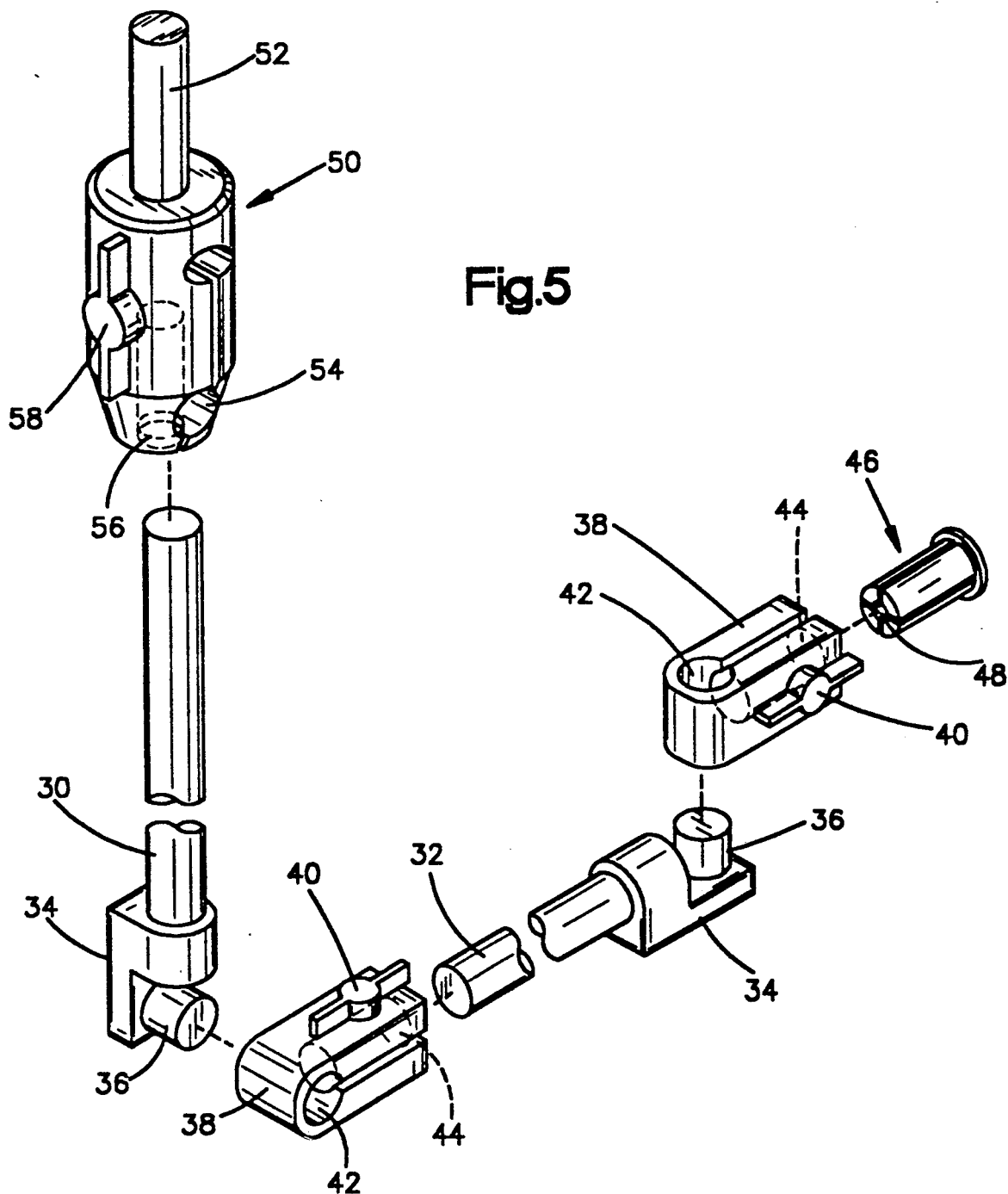
FIG. 5 is a view similar to FIG. 4 showing the holder configured in a different manner.

Referring now to FIGS. 4 and 5, a slightly different embodiment is shown. The components of this embodiment are essentially the same, except the split fixture 22 is replaced with a somewhat modified fixture in the form of a split collar fixture 50. The split collar fixture 50 is comprised of a stud 52 which is adapted to be secured in the chuck jaws 12. A transverse aperture 54 is provided through the split collar fixture 50 and an axial aperture 56 is also provided in the fixture 50. A thumb screw 58 is provided to tighten and loosen the fixture to either open both of the apertures 54 and 56 for the reception of either one of the rods 30 or 32, or tighten the apertures 54 and 56 down for securely holding the rods. In this embodiment, the split collar fixture 50, maintains the rod which is slidably engaged thereby, in an essential relationship with the bed of the machine on which the workpiece 50 rests as shown in FIG. 4 or in an axial relationship normal to the bed of the machine as shown in FIG. 5. This allows for even greater flexibility in mounting a gauge for hard to reach or distant surfaces.

While several embodiments of this invention have been shown and described, various adaptations and modifications can be made without departing from the scope of the invention as defined in the appended claims.

What is claimed is:

1. A gauge holder for mounting a gauge on a machine having chuck jaws and a bed; said holder comprising:
    fixture means adapted to be releasably secured in said chuck jaws,
    first and second rod means,
    said fixture means including fixture-rod mounting means adapted to slidably mount said first rod means in a plane generally parallel to the bed of the machine,
    rod-connecting means to releasably connect and swivelably mount said first and second rod means together at one end of each, and
    gauge-rod mounting means adapted to releasably connect and swivelably mount a gauge at the unconnected end of said second rod means;
    wherein said fixture-rod mounting means is also adapted to slidably mount said second rod means in a plane generally parallel to the bed of the machine and said gauge-rod mounting means is also adapted to releasably connect and swivelably mount a gauge at the unconnected end of said first rod means whereby said first rod means and said second rod means are interchangeable;
    wherein said rod connecting means includes rod clamp means releasably engagable with both rod means;
    wherein said gauge-rod mounting means includes gauge clamp means which are provided to releasably connect the gauge to the rod; and
    wherein the gauge clamp means and the rod clamp means are interchangeable.

2. The device as defined in claim 1 further including adapter means coactable with the gauge and the gauge clamp means to hold the gauge therein.

3. The device as defined in claim 1 wherein said rod clamp means includes a split collar having a pair of apertures at essentially right angles to each other, and means to selectably open and close said split collar.

4. The device as defined in claim 3 wherein the means to selectably open and close the collar includes thumb screw means threaded therein.

5. The device as defined in claim 1 wherein said fixture-rod mounting means is a split fixture and includes means defining a receiving aperture for one of said rods and means to releasably open and close said fixture-rod mounting means for slidably mounting said rod in the aperture.

6. The device as defined in claim 5 wherein said means to open and close said split fixture includes thumb screw means threaded therein.

7. A gauge holder as set forth in claim 1 wherein:
said first rod means has a first end and a second end;
said second rod means has a first end and a second end;
said fixture-rod mounting means is adapted to receive the first end of the first rod means;
said rod-connecting means is adapted to connect the second end of the first rod means to the first end of the second rod means;
said gauge-rod mounting means is adapted to mount a gauge at the second end of said rod means; and
wherein said fixture-rod means is also adapted to receive the first end of the second rod means and said gauge-rod mounting means is also adapted to mount a gauge at the second end of said first rod means whereby said first rod means and said second rod means are interchangeable.

8. A gauge holder as set forth in claim 9 wherein:
said second end of said first rod means includes a first engaging element;
said second end of said second rod means includes a second engaging element;
said rod-connecting means is adapted to be engagable with said second engaging element;
said gauge-rod mounting means is adapted to be engagable with said first engaging element;
said rod-connecting means is also adapted to be engagable with said first engaging element and said gauge-rod mounting means is also adapted to be engagable with said second engaging element whereby said first rod means and said second rod means are interchangeable.

9. A gauge holder for mounting a gauge on a machine having chuck jaws and a bed; said holder comprising:
fixture means adapted to be releasably secured in said chuck jaws,
first and second rod means,
said fixture means including fixture-rod mounting means adapted to slidably mount said first rod means in a plane generally parallel to the bed of the machine,
rod-connecting means to releasably connect and swivelably mount said first and second rod means together at one end of each, and
gauge-rod mounting means adapted to releasably connect and swivelably mount a gauge at the unconnected end of said second rod means;
wherein said fixture-rod mounting means is also adapted to slidably mount said second rod means in a plane generally parallel to the bed of the machine and said gauge-rod mounting means is also adapted to releasably connect and swivelably mount a gauge at the unconnected end of said first rod means whereby said first rod means and said second rod means are interchangeable;
wherein said rod connecting means includes rod clamp means releasably engagable with both rod means; and
wherein each of the rods means has a pivot pin at one end thereof, and wherein said pivot pin on either rod is coactable with said rod clamp means to provide the interconnection of the two rod means.

10. The device as defined in claim 9, wherein said gauge-rod mounting means includes gauge clamp means which is identical to said rod clamp means and wherein the pivot pin on either rod is coactable with said gauge clamp means to secure the gauge thereto.

11. The device as defined in claim 9 wherein said gauge-rod mounting means includes gauge clamp means which are provided to releasably connect the gauge to the rod.

12. The device as defined in claim 9 wherein said rod clamp means includes a split collar having a pair of apertures at essentially right angles to each other, and means to selectably open and close said split collar.

13. The device as defined in claim 9 wherein said fixture-rod mounting means is a split fixture and includes means defining a receiving aperture for one of said rods and means to releasably open and close said fixture-rod mounting means for slidably mounting said rod in the aperture.

14. A gauge holder for mounting a gauge on a machine having chuck jaws and a bed; said holder comprising:
fixture means adapted to be releasably secured in said chuck jaws,
first and second rod means,
said fixture means including fixture-rod mounting means adapted to slidably mount said first rod means in a plane generally parallel to the bed of the machine,
rod-connecting means to releasably connect and swivelably mount said first and second rod means together at one end of each, and
gauge-rod mounting means adapted to releasably connect and swivelably mount a gauge at the unconnected end of said second rod means;
wherein said fixture-rod mounting means is also adapted to slidably mount said second rod means in a plane generally parallel to the bed of the machine and said gauge-rod mounting means is also adapted to releasably connect and swivelably mount a gauge at the unconnected end of said first rod means whereby said first rod means and said second rod means are interchangeable;
wherein said rod connecting means includes rod clamp means releasably engagable with both rod means; and
wherein said fixture means includes aperture means positioned to releasably secure either of said rod means generally normal to the bed of the machine.

* * * * *